(12) United States Patent
Tang et al.

(10) Patent No.: US 11,983,386 B2
(45) Date of Patent: May 14, 2024

(54) COMPUTERIZED SYSTEMS AND METHODS FOR AUTOMATIC GENERATION OF LIVESTREAM CAROUSEL WIDGETS

(71) Applicant: COUPANG CORP., Seoul (KR)

(72) Inventors: Ning Tang, Shanghai (CN); AnAn Hu, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/934,732

(22) Filed: Sep. 23, 2022

(65) Prior Publication Data

US 2024/0103691 A1    Mar. 28, 2024

(51) Int. Cl.
*G06F 3/0482*    (2013.01)
*G06Q 30/0242*    (2023.01)

(52) U.S. Cl.
CPC ....... *G06F 3/0482* (2013.01); *G06Q 30/0246* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 8,984,098 | B1* | 3/2015 | Tomkins | G06F 16/487 709/219 |
| 9,723,367 | B1* | 8/2017 | Long | H04N 21/4751 |
| 10,078,909 | B1* | 9/2018 | Chen | G06N 20/00 |
| 11,006,171 | B1* | 5/2021 | Chen | G06F 16/909 |
| 11,086,936 | B2* | 8/2021 | Lamere | G06F 16/435 |
| 11,153,655 | B1* | 10/2021 | Germano | H04N 21/4668 |
| 11,451,598 | B1* | 9/2022 | Chawla | G06F 16/735 |
| 2008/0215522 | A1* | 9/2008 | Tanaka | G06F 16/904 707/999.005 |

(Continued)

FOREIGN PATENT DOCUMENTS

KR    10-2064292 B1    1/2020

OTHER PUBLICATIONS

International Search Report and Written Opinion of the International Search Authority in counterpart International Application No. PCT/IB2023/055435 dated May 26, 2023 (10 pages).

*Primary Examiner* — Daniel Rodriguez
(74) *Attorney, Agent, or Firm* — FINNEGAN, HENDERSON, FARABOW, GARRETT & DUNNER LLP

(57) ABSTRACT

Computer-implemented systems and methods for automatic generation of livestream carousel widgets are disclosed and may be configured to retrieve a plurality of candidate livestreams based on first data related to one or more users and second data related to a plurality of livestreams, organize the retrieved plurality of candidate livestreams, input third data related to a first user and fourth data related to the retrieved plurality of candidate livestreams into a ranking model, output, from the ranking model, a value for each livestream of the organized plurality of candidate livestreams, based on the outputted value for each livestream, determine a rank for each livestream of the organized plurality of candidate livestreams, generate a livestream carousel widget including a number of candidate livestreams based on the determined rank, and transmit the generated livestream carousel widget for display on a user interface associated with the first user.

18 Claims, 12 Drawing Sheets

(56) References Cited

U.S. PATENT DOCUMENTS

| | | | |
|---|---|---|---|
| 2013/0086082 A1* | 4/2013 | Park | G06F 16/9535 |
| | | | 707/748 |
| 2015/0269488 A1* | 9/2015 | Galai | G06Q 30/02 |
| | | | 706/11 |
| 2016/0315983 A1* | 10/2016 | Lewis | H04L 65/60 |
| 2017/0097967 A1* | 4/2017 | Savliwala | G06F 16/951 |
| 2018/0068026 A1* | 3/2018 | Chen | G06F 16/9537 |
| 2018/0255332 A1* | 9/2018 | Heusser | H04H 20/18 |
| 2018/0336645 A1* | 11/2018 | Price | H04N 21/4661 |
| 2019/0180108 A1* | 6/2019 | Catalano | H04N 21/812 |
| 2019/0266185 A1* | 8/2019 | Rao | H04N 21/4758 |
| 2019/0303683 A1* | 10/2019 | Pearson | G06T 7/60 |
| 2020/0007937 A1* | 1/2020 | Polatkan | H04N 21/251 |
| 2020/0117904 A1* | 4/2020 | van Oldenborgh | G06V 10/25 |
| 2021/0217053 A1* | 7/2021 | Yu | G06N 20/00 |
| 2021/0294847 A1* | 9/2021 | Yoon | H04N 21/8405 |
| 2021/0294855 A1* | 9/2021 | Miao | H04L 67/04 |
| 2021/0390523 A1* | 12/2021 | Trimble | G06Q 20/123 |
| 2022/0122124 A1 | 4/2022 | Li et al. | |
| 2022/0355212 A1* | 11/2022 | Louden | G10L 25/57 |

* cited by examiner

| available_product_ID_1 | live_product_ID_1: similarity_score_1, live_product_ID_2: similarity_score_2,..., live_product_ID_N: similarity_score_N |
|---|---|
| ... | ... |
| available_product_ID_N | live_product_ID_m: similarity_score_m,..., live_product_ID_n: similarity_score_n |

500b

| live_product_ID_1 | stream_ID_1, stream_ID_2... |
|---|---|
| ... | ... |
| live_product_ID_N | stream_ID_m, stream_ID_n... |

FIG. 5 ered plurality of candidate livestreams into a ranking model, and outputting, from the ranking model, a value for each livestream of the organized plurality of candidate livestreams. The method further includes, based on the outputted value for each livestream, determining a rank for each livestream of the organized plurality of candidate livestreams, generating a livestream carousel widget including a number of candidate livestreams based on the determined rank, and transmitting the generated livestream carousel widget for display on a user interface associated with the first user.

COMPUTERIZED SYSTEMS AND METHODS FOR AUTOMATIC GENERATION OF LIVESTREAM CAROUSEL WIDGETS

TECHNICAL FIELD

The present disclosure generally relates to computerized systems and methods for automatic generation of livestream carousel widgets. In particular, embodiments of the present disclosure relate to inventive and unconventional systems for automatically generating livestream carousels by using machine learning and user action statistics to efficiently generate a personalized set of livestreams that are likely to be of interest to a user.

BACKGROUND

Livestream e-commerce platforms provide opportunities for customers to interact with sellers before purchasing products through real-time broadcasting. During a livestream, customers may be able to ask questions regarding products they are interested in to help make a decision regarding a purchase. However, with there being so many livestreams and each livestream running for a long period of time (e.g., around 1 hour), it may be overwhelming for customers to find livestreams promoting products of interest and decide which livestream to watch to satisfy their purchasing needs. In addition, customers may miss out on opportunities to interact with sellers regarding products that they may be interested in because the customers were either unaware that livestreams featuring products of interest were airing, or because the customers themselves did not realize that they may be interested in the products.

To mitigate such problems, conventional video sharing systems implement recommended videos. For example, recommended videos may be determined by comparing the unique viewing habits of a user to the viewing habits of other users to make recommendations based on the videos watched by users with similar viewing habits. In addition, conventional e-commerce systems implement product recommendation engines. For example, recommended products may be generated by monitoring a user's browsing history to identify products of similar categories as the ones that the user may have taken interest in. However, conventional methods are not suitable for generating livestream recommendations as it would require taking into consideration a significant number of factors related to user actions, products and real-time livestream data that, if not performed in a specific manner, can lead to processing inefficiencies as well as unnecessary costs.

Therefore, there is a need for improved methods and systems for automatic generation of livestream carousel widgets by using machine learning and user action statistics to efficiently generate a customized set of livestreams that are likely to be of interest to a user.

SUMMARY

One aspect of the present disclosure is directed to a system comprising one or more memory devices storing instructions and one or more processors configured to execute the instructions to perform a method for automatic generation of livestream carousel widgets. The method includes retrieving a plurality of candidate livestreams based on first data related to one or more users and second data related to a plurality of livestreams, organizing the retrieved plurality of candidate livestreams, inputting third data related to a first user and fourth data related to the retriev Another aspect of the present disclosure is directed to a method for automatic generation of livestream carousel widgets. The method includes retrieving a plurality of candidate livestreams based on first data related to one or more users and second data related to a plurality of livestreams, organizing the retrieved plurality of candidate livestreams, inputting third data related to a first user and fourth data related to the retrieved plurality of candidate livestreams into a ranking model, and outputting, from the ranking model, a value for each livestream of the organized plurality of candidate livestreams. The method further includes, based on the outputted value for each livestream, determining a rank for each livestream of the organized plurality of candidate livestreams, generating a livestream carousel widget including a number of candidate livestreams based on the determined rank, and transmitting the generated livestream carousel widget for display on a user interface associated with the first user.

Yet another aspect of the present disclosure is directed to a computer-implemented system comprising one or more memory devices storing instructions and one or more processors configured to execute the instructions to perform a method for automatic generation of livestream carousel widgets. The method includes retrieving a plurality of candidate livestreams based on first data related to one or more users and second data related to a plurality of livestreams, organizing the retrieved plurality of candidate livestreams, inputting third data related to a first user and fourth data related to the retrieved plurality of candidate livestreams into a neural network, and outputting, from the neural network, a value for each livestream of the organized plurality of candidate livestreams. The method further includes, based on the outputted value for each livestream, generating a livestream carousel widget including a number of candidate livestreams, and transmitting the generated livestream carousel widget for display on a user interface associated with the first user.

Other systems, methods, and computer-readable media are also discussed herein.

BRIEF DESCRIPTION OF THE DRAWINGS

Figure 1C:
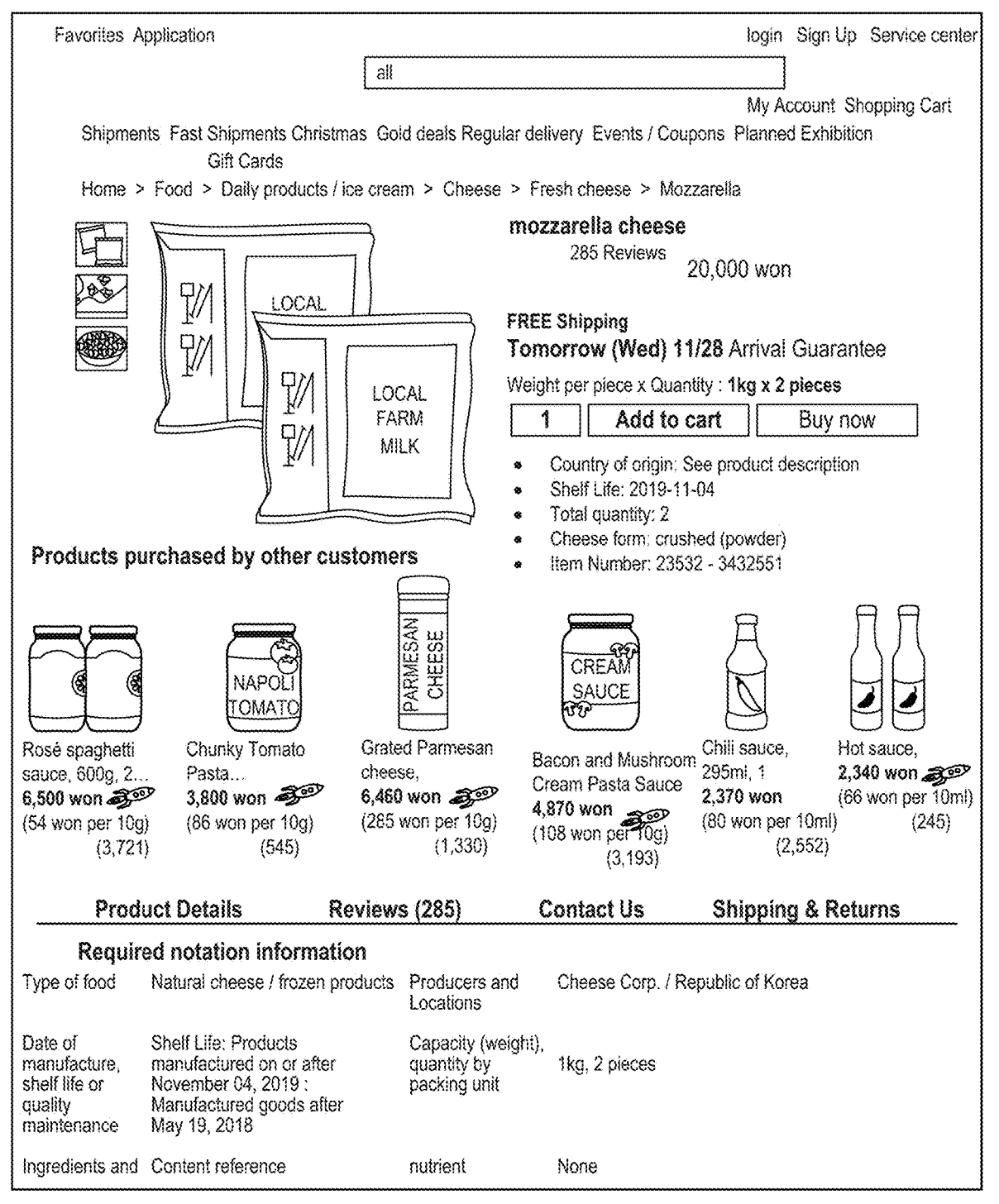

FIG. 1C depicts a sample Single Detail Page (SDP) that includes a product and information about the product along with interactive user interface elements, consistent with the disclosed embodiments.

FIG. 5 shows exemplary indexes associating products with livestreams, consistent with the disclosed embodiments.

DETAILED DESCRIPTION

Figure 1A:
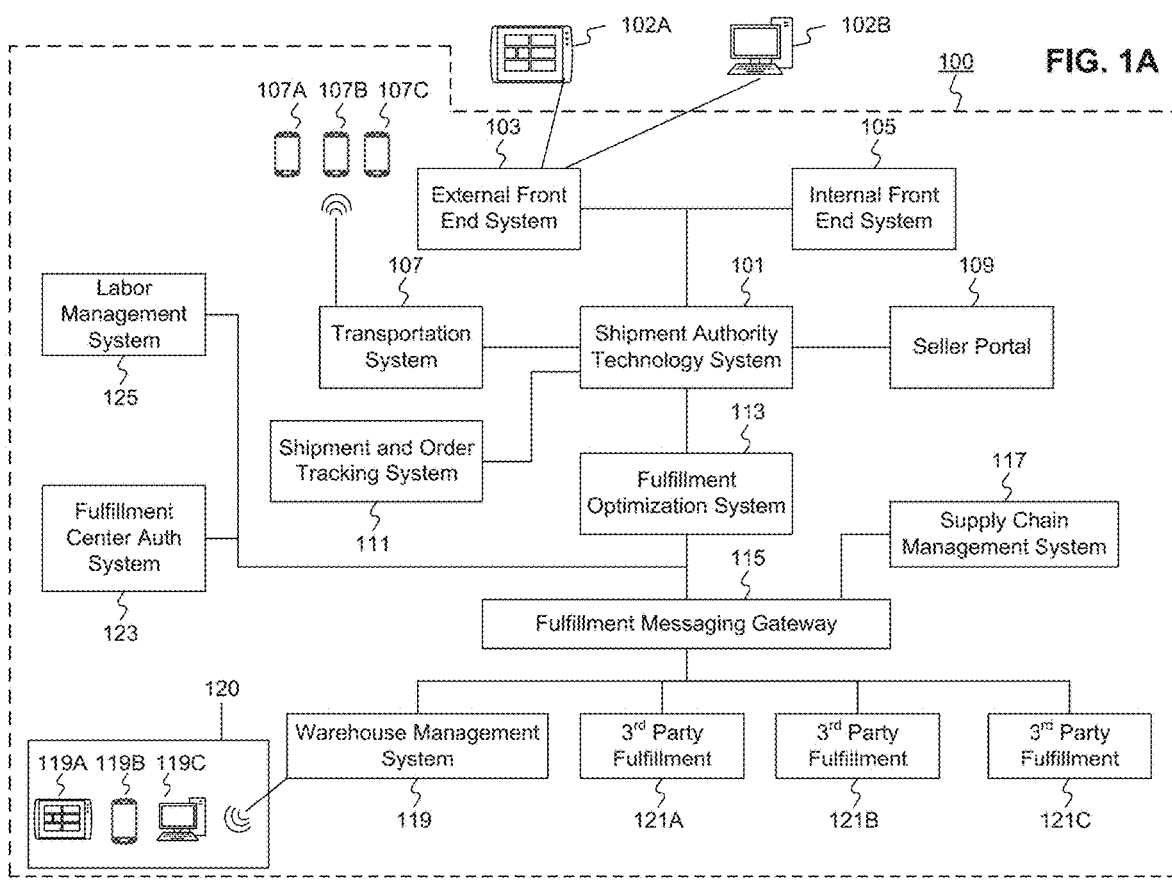
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for automatic generation of carousel widgets by retrieving a plurality of candidate livestreams based on data related to one or more users and a plurality of livestreams, organizing the retrieved plurality of candidate livestreams, inputting data related to a user and related to the retrieved plurality of candidate livestreams into a neural network, and outputting, from the neural network, a value for each livestream of the organized plurality of candidate livestreams. The method further includes, based on the outputted value for each livestream, generating a livestream carousel widget including a number of candidate livestreams based on the outputted value. The disclosed embodiments provide innovative technical features that allow for automatic generation of livestream carousel widgets in an efficient manner. For example, the disclosed embodiments enable retrieval of a plurality of candidate livestreams based on data related to one or more users and a plurality of livestreams, enable organization of the retrieved plurality of candidate livestreams, enable inputting of data into a neural network to output values that allow for generation of a more accurately customized livestream carousel widget to display on a user interface associated with a specific user.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 120), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
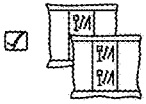
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 120). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 120, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 120, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. During the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 120), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 120, other products may be stored off-site, may be produced on demand, or may be otherwise unavailable for storage in fulfillment center 120. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 120, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
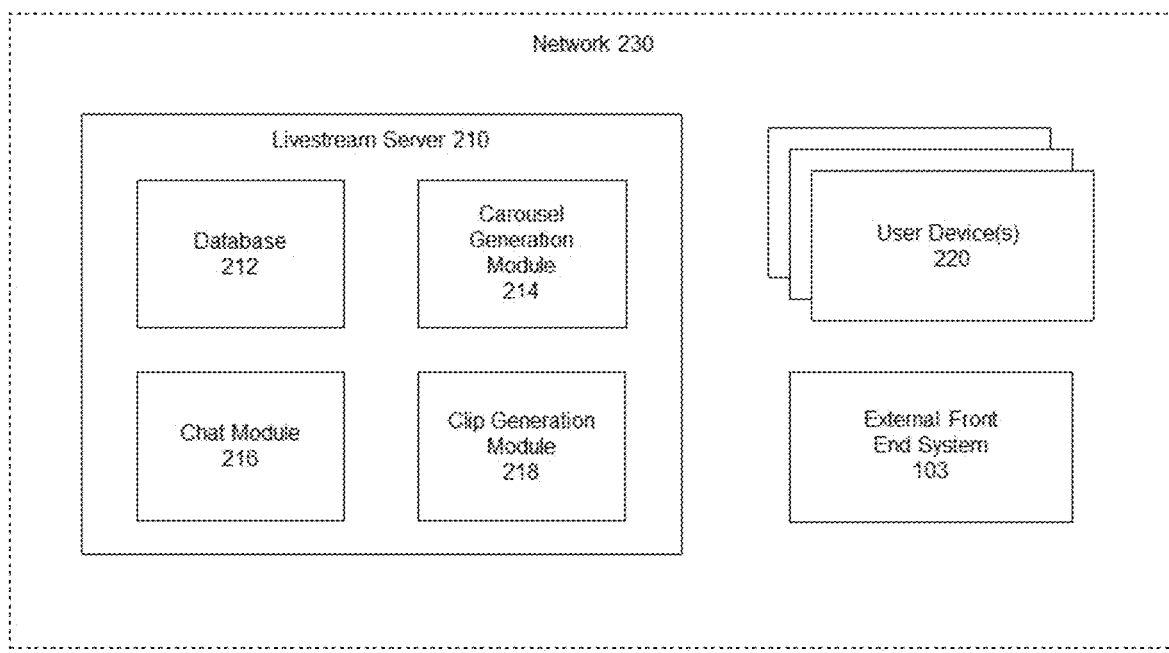
FIG. 2 is schematic block diagram illustrating an exemplary embodiment of a network comprising computerized systems for live e-commerce streaming, consistent with the disclosed embodiments.

FIG. 2 is a schematic block diagram illustrating an exemplary embodiment of a network comprising computerized systems for live e-commerce streaming, consistent with the disclosed embodiments. In FIG. 2, streaming system 200 may include livestream server 210 configured to process data streams in real-time to, for example, allow users (e.g., streamers and viewers) to communicate via livestream to advertise, sell and/or purchase products. Additionally, livestream server 210 may be configured to provide video-on-demand (VOD) services to users such that they can view past livestream videos that have ended livestreaming. System 200 may include livestream server 210, user device(s) 220, external front end system 103, and network 230.

Livestream server 210 may take the form of a server, general-purpose computer, a mainframe computer, a special-purpose computing device such as a graphical processing unit (GPU), laptop, or any combination of these computing devices. In these embodiments, components of livestream server 210 (i.e., database 212, carousel generation module 214, chat module 216, clip generation module 218) may be implemented as one or more functional units implemented using one or more processors based on instructions stored in the one or more memories. Livestream server 210 may be a standalone system, or it may be part of a subsystem, which may be part of a larger system.

Database 212 may be implemented as either an internal database or an external database communicatively coupled to livestream server 210 via network 230. Database 212 may be configured to collect and/or maintain data associated with users of livestream server 210. For example, database 212 may store information about preferences and actions associated with users of livestream server 210. Further, database 212 may include a plurality of livestream videos and information related to the plurality of livestream videos. For example, database 212 may include information related to each livestream video such as, but not limited to, a number of views, a frequency of plays, a frequency of seeks, a frequency of likes over time, a frequency of chats over time, a frequency of product keywords spoken over time, a frequency of product board detections and corresponding timestamps, a number of times that a product was added to a user virtual shopping cart over time, a click-through rate (CTR) over time, and a conversion rate (CVR) over time. CVR may be a measure determined based on a proportion of customers persuaded by a video to add one or more products featured in the video to their respective virtual shopping carts. CTR may be a percentage determined based on the number of times a livestream video is displayed on user interfaces of a VOD platform and a number of times that one or more users click on the displayed livestream video. For example, dividing the number of clicks by the number of impressions (i.e., the number of times the livestream video is displayed), and then multiplying the result by 100 may provide a CTR measurement. Further, database 212 may include a plurality of highlight videos generated from the plurality of livestream videos, discussed in further detail below.

Carousel generation module 214, in some embodiments, may include one or more computing devices configured to generate livestream carousel widgets based on data stored in database 212. For example, carousel generation module 214 may retrieve a plurality of candidate livestreams based on data related to one or more users and data related to a plurality of livestreams, organize the retrieved plurality of candidate livestreams, input data related to a first user and data related to the retrieved plurality of candidate livestreams into a ranking model, such as a ranking neural network, and output a value for each livestream of the organized plurality of candidate livestreams from the ranking model. In addition, based on the outputted value for each livestream, carousel generation module 214 may determine a rank for each livestream of the organized plurality of candidate livestreams, generate a livestream carousel widget including a number of candidate livestreams based on the determined rank, and transmit the generated livestream carousel widget for display on a user interface associated with the first user.

Chat module 216, in some embodiments, may include one or more computing devices configured to enhance livestream engagement. For example, chat module 216 may retrieve, from database 212, a first set of texts and retrieve, for each product of one or more products featured in a livestream, a second set of texts, wherein the second set of texts is generated by compiling a plurality of keywords in review data associated with the product, determining a prevalence value associated with each keyword, selecting one or more keywords based on the determined prevalence value associated with each keyword, organizing the selected one or more keywords, and storing, in database 212, the organized keywords as the second set of texts. Additionally, chat module 216 may transmit a plurality of texts including at least the first and second set of texts for display on one or more user interfaces associated with one or more user devices, and receive user interaction data from at least one of the one or more user devices, wherein the user interaction data includes indication of user interaction by one or more users with at least one or more texts of the plurality of texts via at least one of the one or more user interfaces. Furthermore, chat module 216 may transmit each text of the one or more texts to a second user device, wherein transmitting is based on determining whether the text includes a question, transmitting the text for display on a first page of a second user interface associated with the second user device based on the text not including a question, and transmitting the text for display on a second page of the second user interface based on the text including a question.

Clip generation module 218, in some embodiments, may include one or more computing devices configured to automatically generate highlight videos based on source livestream videos stored in database 212. For example, clip generation module 218 may retrieve user action data for a plurality of source videos from database 212 and select a set of source videos of the plurality of source videos to retrieve from database 212. For each of the selected source videos, clip generation module 218 may split the source video into a plurality of segments and, for each segment, determine segment data to calculate a segment highlight score based on the determined segment data. A number of segments may be selected based on the calculated segment highlight scores and clip generation module 218 may generate a new video based on the selected segments.

Alternatively, components of livestream server 210 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

User device(s) 220 may be similar in design, function, or operation to mobile device 102A or computer 102B described above with respect to FIG. 1A. User device(s) 220 may include one or more computing devices configured to perform one or more operations consistent with disclosed embodiments. For example, user device(s) may include a desktop computer, a laptop, a server, a mobile device (e.g., tablet, smart phone, etc.), or other type of computing device capable of running a computer program or software application associated with livestream server 210. For example, a user of user device 220 may download a mobile commerce application to access the services available on livestream server 210. In some embodiments, user device(s) 220 may be part of system 100 (FIG. 1A). User device(s) 220 may allow users to navigate to external front end system 103 and request a search by entering information into a search box. In other embodiments, however, user device(s) 220 may be independent from system 100. User device(s) 220 may include one or more processors configured to execute software instructions stored in memory, such as memory included in user device(s) 220, to perform operations to implement the functions described below. User device(s) 220 may be configured for wired and/or wireless communications and may include software that when executed by a processor performs internet-related communication (e.g., TCP/IP) and content display processes. For instance, user device(s) 220 may execute browser software that generates and displays interfaces including content on a display device included in, or connected to, user device(s) 220. User device(s) 220 may execute applications that allow user device(s) 220 to communicate with components over network 230 and display content in interfaces via display devices included in user device(s) 220.

Network 230 may be any type of network configured to provide communications between components of system 200. For example, network 230 may be any type of network (including infrastructure) that provides communications, exchanges information, and/or facilitates the exchange of information, such as the Internet, or other suitable connection(s) that enables the sending and receiving of information between the components of system 200. In other embodiments, network 230 may include multiple networks, organizing for example a network of networks.

Figure 3:
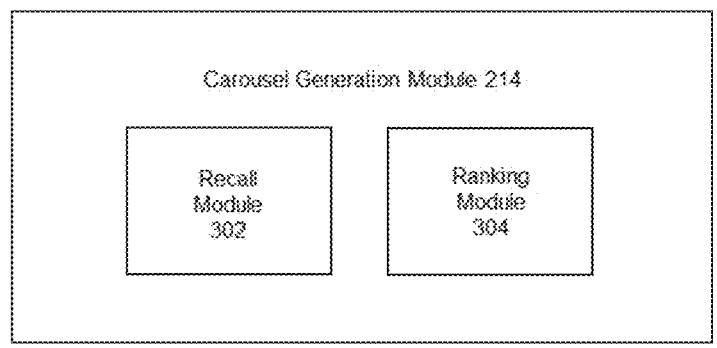
FIG. 3 is a schematic block diagram illustrating an exemplary embodiment of a carousel generation module, consistent with the disclosed embodiments.

FIG. 3 is a schematic block diagram illustrating an exemplary embodiment of the carousel generation module 214, consistent with the disclosed embodiments. As depicted in FIG. 3, carousel generation module 214 may include recall module 302 and ranking module 304.

Recall module 302, in some embodiments, may include one or more computing devices configured to retrieve livestream candidates for specific users. For example, recall module 302 may retrieve livestream candidates based on user history actions (e.g., click, add-to-cart, purchase, order), wherein each action has an associated product ID and timestamp. In some embodiments, recall module 302 may communicate with external front end system 103 to retrieve information from systems or devices in system 100 to retrieve information related to all products available to users via system 100. Recall module 302 may further include a machine learning model (e.g., XGBoost) trained to create a vector representation of all products available to users via system 100 and calculate a relevance between all products available via system 100 and all products available via livestream server 210 by implementing nearest neighbor searching algorithms. In some embodiments, recall module 302 may retrieve livestream candidates based on demographic statistics (e.g., gender, age, etc.) associated with livestreams. For example, recall module 302 may retrieve demographic statistics for a livestream and compare the statistics to demographics data associated with a user stored in a database (e.g., database 212). Additionally or alternatively, recall module 302 may retrieve livestream candidates based on click-through rates (CTR) and/or conversion rates (CVR) associated with livestreams. For example, recall module 302 may, for each livestream of a plurality of livestreams, dynamically determine a percentage of users that click on the livestream and/or dynamically determine a percentage of people that make a purchase while viewing the livestream. Based on the dynamically determined data, recall module 302 may sort the livestreams and determine which livestreams should be included as livestream candidates. Additionally or alternatively, recall module 302 may retrieve livestream candidates based on a status associated with each livestream (e.g., whether a livestream is live or non-live). For example, recall module 302 may retrieve all livestreams with a status of live as livestream candidates. Additionally or alternatively, recall module 302 may organize the retrieved livestream candidates. For example, recall module 302 may deduplicate the retrieved livestream candidates by livestream ID and/or product ID.

Ranking module 304, in some embodiments, may include one or more computing devices configured to rank the livestream candidates retrieved by recall module 302. In some embodiments, ranking module 304 may include a simple scorer. For example, ranking module 304 may score the deduplicated livestream candidates by a linear combination of multiples (i.e., multiply the number of times a livestream candidate was included in the retrieved livestream candidates). Additionally or alternatively, ranking module 304 may include a neural network trained to output a value for each livestream of the retrieved livestream candidates based on input data related to user actions and products associated with each livestream. For example, ranking module 304 may input features related to user actions (e.g., clicks, add-to-cart, queries (i.e., searches), etc.) and products (e.g., product ID, brand ID, category ID, sequence of categories related to queries) into the deep interest neural network, and output a rank for each livestream candidate based on the input features.

Figure 4:
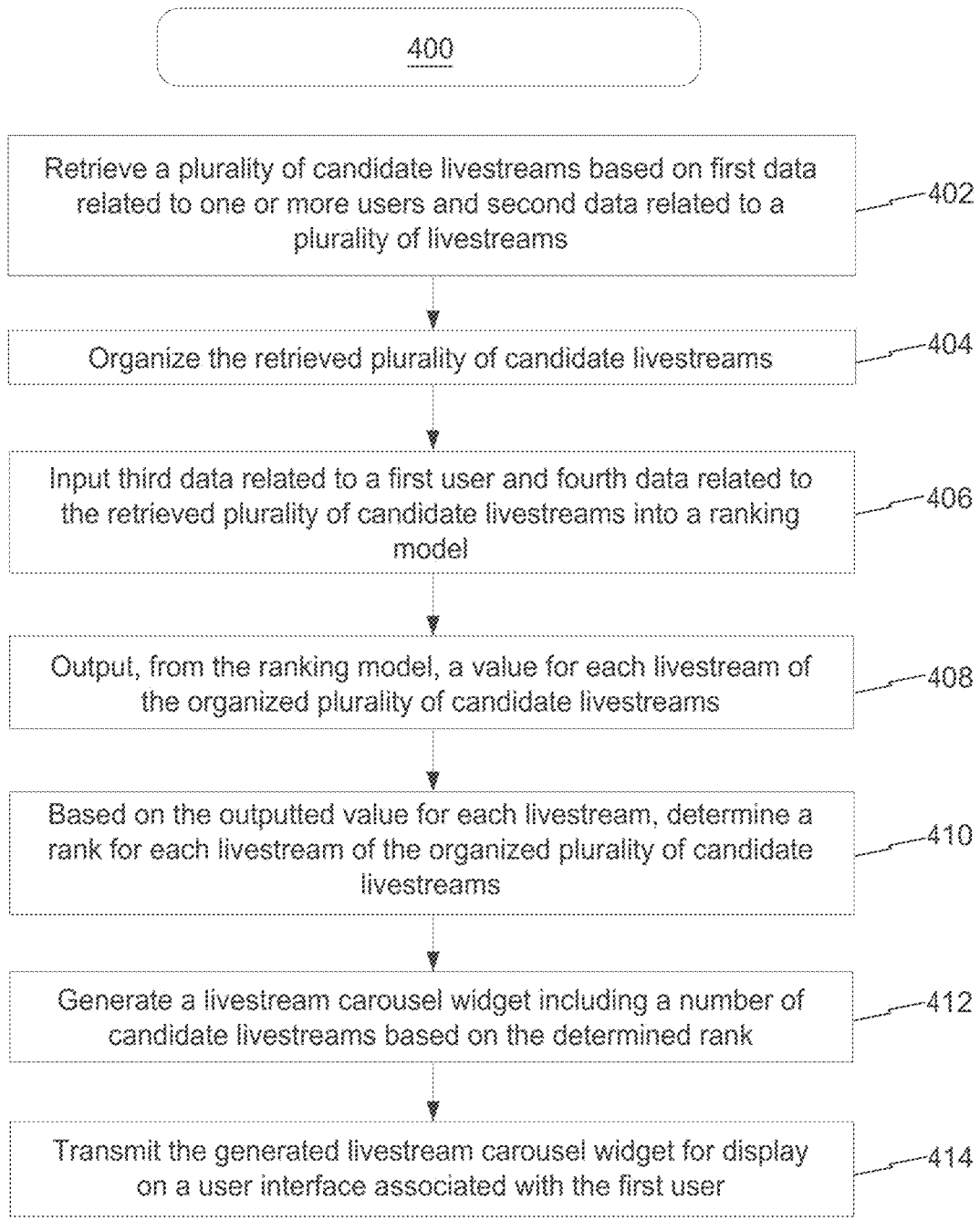
FIG. 4 shows an exemplary method for automatically generating carousel widgets, consistent with the disclosed embodiments.

FIG. 4 shows an exemplary method 400 for automatically generating livestream carousel widgets. The method or a portion thereof may be performed by livestream server 210. For example, the system may include one or more processors and a memory storing instructions that, when executed by the one or more processors, cause the system to perform the steps shown in FIG. 4.

In step 402, at least one processor may be configured to retrieve a plurality of candidate livestreams based on first data related to one or more users and second data related to a plurality of livestreams. In some embodiments, the first data related to one or more users may include a first set of candidate livestreams determined based on user action history. For example, livestream server 210 may retrieve user action history data (e.g., log tracking data associated with a user clicking a product displayed on a user interface, adding a product to a user virtual shopping cart, ordering a product via the user interface, etc.) associated with users accessing services available on livestream server 210, wherein each user action may have an associated product ID and timestamp. In some embodiments, livestream server 210 may communicate with systems or devices in system 100 to retrieve user action history data associated with users accessing services available on system 100, wherein each user action may have an associated user ID, action type (e.g., click, add-to-cart, purchase, etc.), product ID and timestamp. In some embodiments, livestream server 210 may retrieve user action history data from database 212. Additionally or alternatively, the first set of candidate livestreams may be determined by a machine learning model trained on the retrieved user action history data. For example, the machine learning model may be trained to receive product IDs for all products associated with a user action (e.g., click, add-to-cart, and/or purchase product), wherein each product ID is associated with a product available to users via livestream server 210 (livestream product ID) and/or system 100 (available product ID). In some embodiments, the input data may be data associated with a given time period (e.g., all user actions from the past few months, such as 6 months, 5 months, 1 month, etc.). Additionally or alternatively, based on the input data, the machine learning model may be configured to output data in the form of embedded vectors that represent relevance between the inputted product ID and products on available livestreams. For example, the machine learning model may output an embedded vector for each input product ID, wherein each embedded vector may be a predetermined dimension. Additionally or alternatively, the machine learning model may be trained incrementally (e.g., new product IDs are added to the model daily).

In some embodiments, the at least one processor may generate input (e.g., product IDs) and output (e.g., embedded vectors) by a node2vec model configured to map nodes in a graph (i.e., products represented as nodes and relationship between products represented as edges), generated based on retrieved data, to an embedding space (i.e., generate vector representations of products). The node2vec model may take a graph consisting of nodes and their relationships, wherein the nodes may represent product IDs associated with user actions compiled over a given time period, and transform the graph into a numerical representation for input into the machine learning model. For example, each node may represent a product ID associated with one or more user actions such as a click, add-to-cart, or purchase action associated with a product, wherein the one or more user actions occurred within a certain time period (e.g., the past 6 months). Additionally, the node2vec model may generate, for each node, a random walk of a fixed length N to generate sequences for training the machine learning model. For example, the node2vec model may generate a series of random walks with a particular node as a starting node based on the fixed length N, and may input the generated series of random walks into a skip-gram model to retrieve hidden layer weights as node embeddings (i.e., vector corresponding to a node in the network).

In some embodiments, the machine learning model may calculate a relevance score (i.e., similarity score) between each product available to users via system 100 (i.e., available product IDs) and each product available to users via livestream server 210 (i.e., livestream products) based on the outputted embedded vectors. For example, the machine learning model may use an approximate nearest neighbor searching algorithm to calculate the relevance score and associate each available product of the available products with each livestream product based on the outputted embedded vectors associated with the input product IDs. In some embodiments, the machine learning model may generate a first index using the outputted vectors associated with available product IDs as query vectors and may associate each query vector with a predetermined number (e.g., 50, 60, 100) of outputted vectors associated with livestream product IDs that have the highest relevance scores (i.e., nearest neighbors). Based on the result, the machine learning model may generate a second index to associate livestream product IDs with livestream IDs to identify which livestreams feature products associated with the livestream product IDs.

In some embodiments, livestream server 210 may determine the first set of candidate livestreams by identifying, using the first and second indexes, livestream product IDs that correspond to user action history data of a first user. For example, livestream server 210 may retrieve user action history data associated with a first user for whom the livestream carousel widget is being generated, and rank each available product ID associated with user action history data of the first user (e.g., click, add-to-cart, and purchase product actions performed by the first user) to determine which products of the products available via system 100 were of most interest to the first user. In some embodiments, ranking each available product ID may include counting a number of user actions (e.g., click, add-to-cart, and purchase) associated with each available product ID and ordering the product IDs from highest number of associated user actions to lowest number of associated user actions, or vice versa. Additionally or alternatively, livestream server 210 may use the generated first and second indexes to match each ranked product ID to one or more livestream product IDs to determine one or more livestream IDs as the first set of candidate livestreams. In some embodiments, livestream server 210 may match a predetermined number of ranked product IDs to a predetermined number of livestream product IDs to determine a set of livestream IDs as the first set of candidate livestreams.

In some embodiments, the first data related to one or more users may further include a second set of candidate livestreams determined based on user demographics (e.g., age, gender, etc.) of the first user. For example, the second set of candidate livestreams may be determined based on conversion rate statistics (conversion unique stream views (USV), i.e., number of unique user IDs associated with add-to-cart and/or purchase actions in a livestream) for livestreams of different genders and/or ages to identify livestreams that are most popular amongst users of the same gender and/or age group as the first user.

In some embodiments, the second data related to a plurality of livestreams may include a third set of candidate livestreams determined based on a click-through rate (CTR) and a conversion rate (CVR) associated with each livestream of the plurality of candidate livestreams. For example, livestream server 210 may retrieve livestreams with a high CVR, wherein CVR may be a measure of what proportion of users watching a livestream are persuaded to add one or more products featured in the livestream to their respective virtual shopping carts. Additionally or alternatively, livestream server 210 may retrieve livestreams with a high CTR, wherein CTR may be a percentage determined based on the number of times a livestream is displayed on user interfaces and a number of times that one or more users click on the displayed livestream. For example, dividing the number of clicks by the number of impressions (i.e., the number of times the livestream video is displayed), and then multiplying the result by 100 may provide a CTR measurement. In some embodiments, livestream server 210 may be configured to monitor and track real-time user actions for each livestream of a plurality of livestreams. In some embodiments, real-time user actions for determining CTR and CVR may be retrieved from a third-party service configured to monitor and track real-time user actions (e.g., click, add-to-cart, purchase) associated with each livestream of the plurality of livestreams. Additionally or alternatively, the second data related to a plurality of livestreams may include a fourth set of candidate livestreams with a status of live. For example, livestream server 210 may be configured to retrieve all livestreams that are currently live (i.e., on air).

In step 404, the at least one processor may be configured to organize the retrieved plurality of candidate livestreams. For example, livestream server 210 may take the retrieved plurality of candidate livestreams based on first and second data and may list the candidate livestreams by their respective livestream IDs and product IDs. In some embodiments, organizing the retrieved candidate livestreams may include removing duplicate livestream IDs. For example, different products may be featured in one or more of the same livestreams, and thus one or more livestream IDs may be included more than once in the retrieved candidate livestreams. In some embodiments, livestream server 210 may deduplicate livestream IDs and record the number of times each livestream ID is deduplicated from the retrieved candidate livestreams.

In step 406, the at least one processor may be configured to input third data related to the first user and fourth data related to the retrieved plurality of candidate livestreams into a ranking model. In some embodiments, the ranking model may use a simple scorer ranking such as a linear combination of multiple scorers. For example, the ranking model may include multiple scorers, wherein a first scorer calculates, for each candidate livestream, a first score based on a relevance between historical user actions and each product featured in the livestream. Additionally or alternatively, the ranking model may include a second scorer, wherein the second scorer calculates, for each candidate livestream, a second score based on real-time performance metrics such as traffic, number of purchases, CTR, and/or CVR. Based on the scores determined by the first scorer and the second scorer, the ranking model may calculate, for each candidate livestream, a final ranking score. In some embodiments, the final ranking score may be calculated by adding the first score multiplied by a first weight to the second score multiplied by a second weight (i.e., final ranking score= (weight1*score1)+(weight2*score2)), wherein the weights are determined by online A/B testing results (e.g., CTR, CVR, unique views (UV)). In some embodiments, the ranking model may determine a score for each livestream based on the number of times a livestream ID corresponding to the livestream is deduplicated, wherein a higher number of deduplications may indicate a higher score. Additionally or alternatively, the ranking model may include a neural network to improve accuracy in ranking livestreams. For example, livestream server 210 may input the scores determined by the linear combination of multiple scorers, data related to the first user, such as user demographics (e.g., age, gender, etc.) and user action history data (e.g., product IDs, category IDs and/or brand IDs for products that the first user clicked on, added to cart, and/or purchased), as well as data related to the retrieved plurality of candidate livestreams (e.g., user action history data and product IDs, category IDs and/or brand IDs associated with each product featured in each retrieved candidate livestream) into a deep neural network (DNN), such as a convolutional neural network (CNN).

In some embodiments, the neural network may be comprised of neurons (i.e., nodes) that are organized into multiple layers such as a first layer, one or more hidden layers (e.g., fully connected (FC) layers), and an output layer. Each neuron may compute an activation function, and neurons that are connected to neurons of successive layers may have associated weights that transform input data to output data for forwarding to neurons of a next layer and ultimately an overall output. Additionally, weights may be updated iteratively to improve the ranking accuracy of the DNN. In some embodiments, the activation function may include a Parametric Rectified Linear Unit (PReLU), SoftMax Function or Linear Activation Function. Additionally or alternatively, the neural network may include a pooling layer to down-sample inputs from a previous layer to produce outputs with a condensed resolution, which may reduce the spatial dimension of input. This may allow for reducing computational costs associated with an excessive number of parameters or weights as well as allow for the discarding of irrelevant details to extract only useful information.

Figure 6A:
FIG. 6A shows an exemplary livestream carousel widget, consistent with the disclosed embodiments.
Figure 6A:
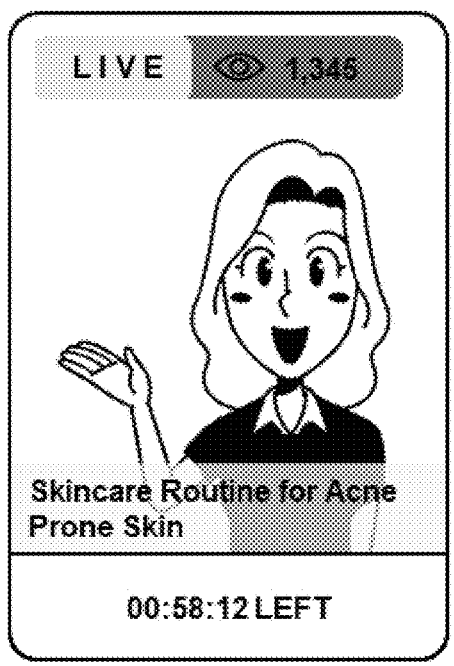
Figure 6A:

In some embodiments, the neural network may be trained to output a value for each retrieved candidate livestream to determine which livestreams of the retrieved plurality of candidate livestreams are most likely to be of interest to the first user based on the data related to the first user. For example, the input layer of the neural network may include features associated with the first user, such as user profile features (e.g., age, gender, etc.), product IDs of products associated with recent user actions (e.g., a product associated with a click, add-to-cart, purchase action performed in the last hour, day, week, etc.), one or more vendor IDs and category IDs associated with each product ID, a sequence of categories related to user queries (i.e., searches), and context features (e.g., an hour of the day and day of the week that the first user visits livestream widgets, i.e., a user interface of the first user displays one or more clickable widgets each representing a livestream (e.g. as shown in FIG. 6A), and/or a type of device used by the first user, such as Android/IOS). Additionally, the input layer of the neural network may consist of features associated with each candidate livestream, such as product information (e.g., product ID, category) of one or more products featured in the candidate livestream, and real time performance metrics associated with the candidate livestream. The neural network model is initially trained and updated incrementally by inputting each user feature (e.g., profile feature, product ID associated with user action, context feature) and all candidate livestream features. After each user feature and candidate livestream feature pair is fed to the neural network model and the process is repeated several times, the neural network model can be used to predict future user feature and candidate livestream feature pairs to determine candidate livestreams that are likely to be of interest to a particular user.

In step 408, the at least one processor may be configured to output, from the ranking model, a value for each livestream of the organized list of candidate livestreams. In some embodiments, the ranking model may output a vector including a user ID, a livestream ID, and a score, wherein the score is a value between 0 and 1 for each livestream of the organized plurality of candidate livestreams, and wherein the value may represent a likelihood that the first user would be interested (e.g., click, add-to-cart, purchase any product) in the livestream. For example, value closer to 1 may represent a high likelihood while a value closer to 0 may represent a low likelihood.

In step 410, the at least one processor may be configured to determine a rank for each livestream of the organized plurality of candidate livestreams based on the outputted value for each livestream. In some embodiments, the ranking model may rank the organized plurality of candidate livestreams from highest likelihood (i.e., livestreams with values closest to 1) to lowest likelihood (i.e., livestreams with values closest to 0).

In step 412, the at least one processor may be configured to generate a livestream carousel widget including a number of candidate livestreams based on the outputted rank. In some embodiments, the livestream carousel widget may be generated based on a predetermined number of highest ranked candidate livestreams. For example, livestream server 210 may be configured to select the top 10 highest ranked livestreams to generate the livestream carousel widget.

In step 414, the at least one processor may be configured to transmit the generated livestream carousel widget for display on a user interface associated with a first user of the one or more users. In some embodiments, the generated livestream carousel widget may be an interactive user interface element. For example, the first user may be able to, via the user interface of a user device associated with the first user, interact with the displayed livestream carousel widget (e.g., scroll, slide, fade, move, click) to view and select from a personalized set of livestreams generated based on user action history data specific to the first user.

In some embodiments, the at least one processor may be configured to generate and transmit an updated livestream carousel widget. For example, livestream server 210 may be configured to track whether the first user has clicked on a particular candidate livestream included the livestream carousel widget after seeing it on the user interface. Based on detecting that, after a predetermined number of occurrences, the first user has seen the particular candidate livestream on the user interface but has not clicked on it, livestream server 210 may be triggered to generate an updated livestream carousel widget. In some embodiments, livestream server 210 may generate the updated livestream carousel widget by removing the particular candidate livestream and adding the next highest ranked livestream of the outputted rank from step 412. In some embodiments, livestream server 210 may generate and transmit the updated livestream carousel widget by repeating steps 402 to 412. Additionally or alternatively, livestream server 210 may generate and transmit an updated livestream carousel widget each time one or more new user actions are detected based on communication with systems or devices in system 100.

FIG. 5 shows exemplary indexes 500a and 500b with respect to the first and second indexes discussed above. For example, index 500a is an example of a first index generated by the machine learning model discussed in step 402 of FIG. 4, wherein available product IDs (e.g., query vectors available_product_ID_1, available_product_ID_N) are associated with livestream product IDs (e.g., live_product_ID_1, live_product_ID_2, live_product_ID_N, live_product_ID_m, live_product_ID_n) and their respective relevance or similarity scores (e.g., similarity_score_1, similarity_score_2, similarity_score_N, similarity_score_m, similarity_score_n). Index 500b is an example of a second index generated by the machine learning model discussed in step 402, wherein livestream product IDs are associated with livestream IDs (e.g., stream_ID_1, stream_ID_2, stream_ID_m, stream_ID_n).

Figure 6B:
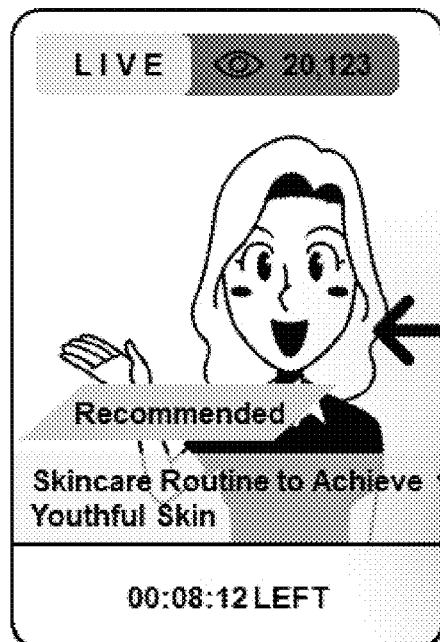
FIG. 6B shows an exemplary livestream carousel widget, consistent with the disclosed embodiments.
Figure 6B:
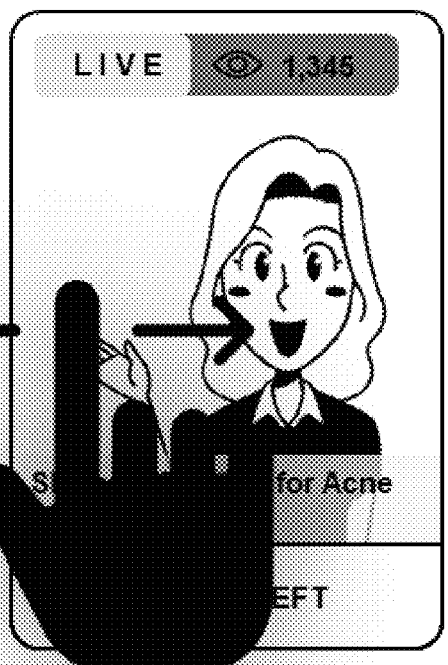
Figure 6B:

FIGS. 6A and 6B show an exemplary livestream carousel widget displayed on a user interface of a user device. For example, as shown in FIG. 6A, the user interface may include recommended livestream carousel widgets determined based on the disclosed embodiments.

As shown in FIG. 6B, a user may swipe left or right to view the recommended livestream carousel widgets. The user interface may include, under each displayed recommended livestream, information about one or more products featured in the livestream.

Figure 7:
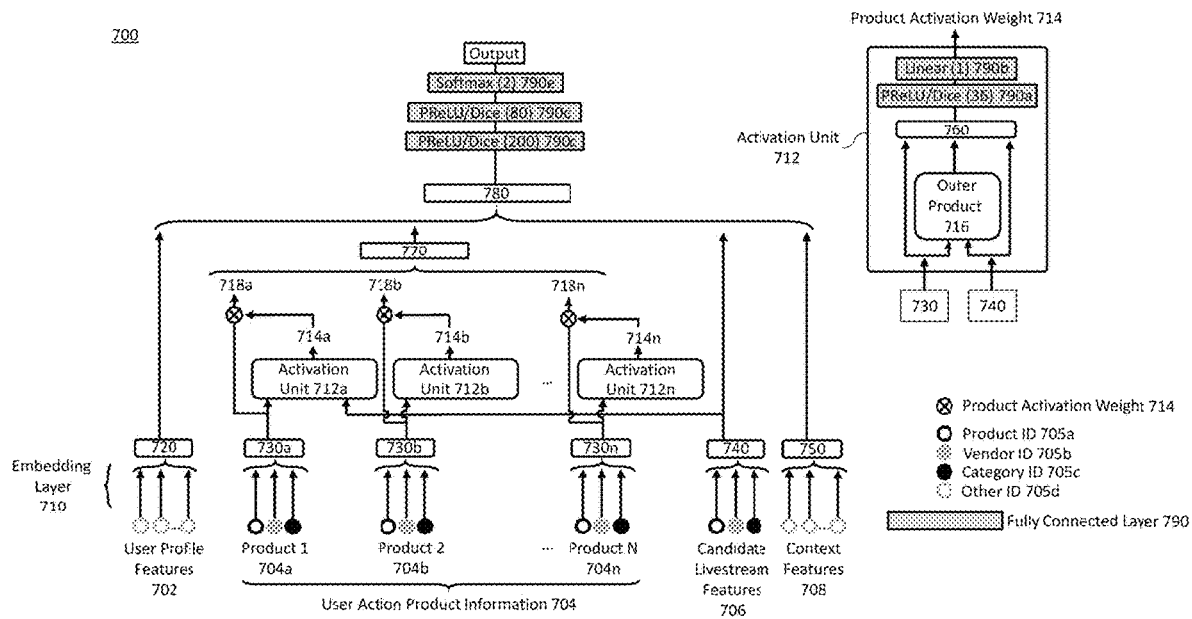
FIG. 7 shows an exemplary neural network model for ranking the candidate livestreams, consistent with the disclosed embodiments.

FIG. 7 shows an exemplary neural network model for ranking the candidate livestreams as described in steps 406 to 410. As described above, the input layer of the neural network may include features associated with the first user, such as user profile features 702 (e.g., age, gender, etc.) along with the associated IDs 705d, user action product information 704 (e.g., 704a, 704b, ... 704n), such as product IDs 705a of products associated with recent user actions (e.g., a product associated with a click, add-to-cart, purchase action performed in the last day, hour, week, etc.), one or more vendor IDs 705b and category IDs 705c associated with each product ID 705a, a sequence of categories related to user queries (i.e., searches), and context features 708 (e.g., an hour of the day and day of the week that the first user visits livestream widgets, and a type of device used by the first user, such as Android/IOS) including associated IDs 705d. Additionally, the input layer of the neural network may consist of candidate livestream features 706, such as product information (e.g., product IDs 705a, vendor IDs 705b, category IDs 705c) of one or more products featured in the candidate livestream, and real time performance metrics associated with the candidate livestream. The input features may be embedded into fixed length vectors of a predefined size within embedding layer 710 and concatenated (720, 730a, 730b, ... 730n, 740 and 750) prior to further processing. In some embodiments, the input layer of the neural network may consist of candidate livestream features 706 for a plurality of candidate livestreams.

In some embodiments, the product information associated with recent user actions 704 (e.g., 704a, 704b, ... 704n) and candidate livestream features 706 may be further processed by activation unit 712 of the neural network to determine an activation weight 714 for each product. For example, activation unit 712 may, for each product, concatenate (760) a concatenated embedded vector 730 of product information 704 (e.g., 730a, 730b, ... 730n), a concatenated embedded vector 740 of candidate livestream features 706, and an outer product 716 of the two concatenated embedded vectors 730 and 740. Additionally, the activation unit may further process the result, which may be of a certain vector length (e.g. 36), with an activation function, such as PReLU (Parametric Rectified Linear Unit) or Dice 790a and subsequently a linear activation function 790b to output a single value (e.g. vector of length 1) as activation weight 714 (e.g., 714a, 714b, ... 714n) associated with the product, which the neural network may then multiply by the concatenated embedded vector (e.g., 730a, 730b, ... 730n) of product information 704 to determine a product input value (e.g., 718a, 718b, ... 718n). Once product input values 718a, 718b, ... and 718n are determined for each product, the neural network model may perform SUM pooling (770) to take the sum of the product input values 718a, 718b, ... and 718n.

In some embodiments, the neural network model may be further configured to concatenate and flatten (780) user profile features 702, candidate livestream features 706, context features 708, and sum 770 for further processing. Once the input features are concatenated and flattened, the neural network model may process the result, which may be of a certain vector length (e.g. 200), with a fully connected layer 790 activation function 790c. In order to improve the performance of the neural network model, the neural network model may be configured to further process the result, which may be of a certain vector length (e.g. 80), with another fully connected layer 790 activation function 790d. Just before the output layer, the neural network model may be configured to process the result, which may be of a certain vector length (e.g. 2), with a Softmax activation function 790e, which may output a value between 0 and 1, representing a score for a candidate livestream. The neural network model may be configured to output a score for each candidate livestream based on the number of candidate livestreams considered in the input layer (e.g., if the neural network model inputs candidate livestream features 706 for 2 candidate livestreams, the neural network model will output 2 scores, one for each candidate livestream). In other embodiments, the lengths of the vectors associated with each function may vary.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for automatic generation of livestream carousel widgets, the system comprising:
   one or more memory devices storing instructions; and
   one or more processors configured to execute the instructions to perform operations comprising:
      retrieving a plurality of candidate livestreams based on first data related to one or more users and second data related to a plurality of livestreams, wherein the first data includes a first set of candidate livestreams determined based on user action history by a machine learning model trained to associate a plurality of livestream IDs with a plurality of product IDs, and wherein each user action of the user action history is associated with at least one product ID of the plurality of product IDs and a timestamp;
      organizing the retrieved plurality of candidate livestreams;
      inputting third data related to a first user and fourth data related to the retrieved plurality of candidate livestreams into a ranking model;
      outputting, from the ranking model, a value for each livestream of the organized plurality of candidate livestreams;
      based on the outputted value for each livestream, determining a rank for each livestream of the organized plurality of candidate livestreams;
      generating a livestream carousel widget including a number of candidate livestreams based on the determined rank; and
      transmitting the generated livestream carousel widget for display on a user interface associated with the first user.

2. The computer-implemented system of claim 1, wherein the first data further includes a second set of candidate livestreams determined based on user demographics.

3. The computer-implemented system of claim 1, wherein the second data related to a plurality of livestreams includes a set of candidate livestreams determined based on at least one of a click-through rate (CTR) or a conversion rate (CVR) associated with each livestream of the plurality of candidate livestreams.

4. The computer-implemented system of claim 1, wherein the second data related to a plurality of livestreams includes a set of candidate livestreams with a status of live.

5. The computer-implemented system of claim 1, wherein organizing the retrieved candidate livestreams includes removing duplicate livestreams.

6. The computer-implemented system of claim 1, wherein the ranking model comprises a deep neural network.

7. The computer-implemented system of claim 1, wherein the fourth data includes at least a category ID, brand ID, and product ID associated with each product featured in each livestream of the retrieved plurality of candidate livestreams.

8. The computer-implemented system of claim 1, wherein the livestream carousel widget is generated based on a predetermined number of highest ranked candidate livestreams.

9. The computer-implemented system of claim 1, wherein the generated livestream carousel widget is an interactive user interface element.

10. A computer-implemented method for generating livestream carousel widgets, the method comprising:
    retrieving a plurality of candidate livestreams based on first data related to one or more users and second data related to a plurality of livestreams, wherein the first data includes a first set of candidate livestreams determined based on user action history by a machine learning model trained to associate a plurality of livestream IDs with a plurality of product IDs, and wherein each user action of the user action history is associated with at least one product ID of the plurality of product IDs and a timestamp;
    organizing the retrieved plurality of candidate livestreams;
    inputting third data related to a first user and fourth data related to the retrieved plurality of candidate livestreams into a ranking model;
    outputting, from the ranking model, a value for each livestream of the organized plurality of candidate livestreams;

based on the outputted value for each livestream, determining a rank for each livestream of the organized plurality of candidate livestreams;

generating a livestream carousel widget including a number of candidate livestreams based on the determined rank; and transmitting the generated livestream carousel widget for display on a user interface associated with the first user.

11. The computer-implemented method of claim 10, wherein the first data further includes a second set of candidate livestreams determined based on user demographics.

12. The computer-implemented method of claim 10, wherein the second data related to a plurality of livestreams includes a set of candidate livestreams determined based on a click-through rate (CTR) and a conversion rate (CVR) associated with each livestream of the plurality of candidate livestreams.

13. The computer-implemented method of claim 10, wherein the second data related to a plurality of livestreams includes a set of candidate livestreams with a status of live.

14. The computer-implemented method of claim 10, wherein organizing the retrieved plurality of candidate livestreams includes removing duplicate livestreams.

15. The computer-implemented method of claim 10, wherein the ranking model comprises a deep neural network.

16. The computer-implemented method of claim 10, wherein the fourth data includes at least a category ID, brand ID, and product ID associated with each product featured in each livestream of the retrieved plurality of candidate livestreams.

17. The computer-implemented method of claim 10, wherein the livestream carousel widget is an interactive user interface element generated based on a predetermined number of highest ranked candidate livestreams.

18. A computer-implemented system for generating livestream carousel widgets, the system comprising:

one or more memory devices storing instructions; and one or more processors configured to execute the instructions to perform operations comprising:

retrieving a plurality of candidate livestreams based on first data related to one or more users and second data related to a plurality of livestreams, wherein the first data includes a first set of candidate livestreams determined based on user action history by a machine learning model trained to associate a plurality of livestream IDs with a plurality of product IDs, and wherein each user action of the user action history is associated with at least one product ID of the plurality of product IDs and a timestamp;

organizing the retrieved plurality of candidate livestreams;

inputting third data related to a first user and fourth data related to the retrieved plurality of candidate livestreams into a neural network;

outputting, from the neural network, a value for each livestream of the organized plurality of candidate livestreams;

based on the outputted value for each livestream, generating a livestream carousel widget including a number of candidate livestreams; and transmitting the generated livestream carousel widget for display on a user interface associated with the first user.

* * * * *